INVENTOR
JAMES C. LAWRENCE

BY Strauch, Nolan & Neale
ATTORNEYS

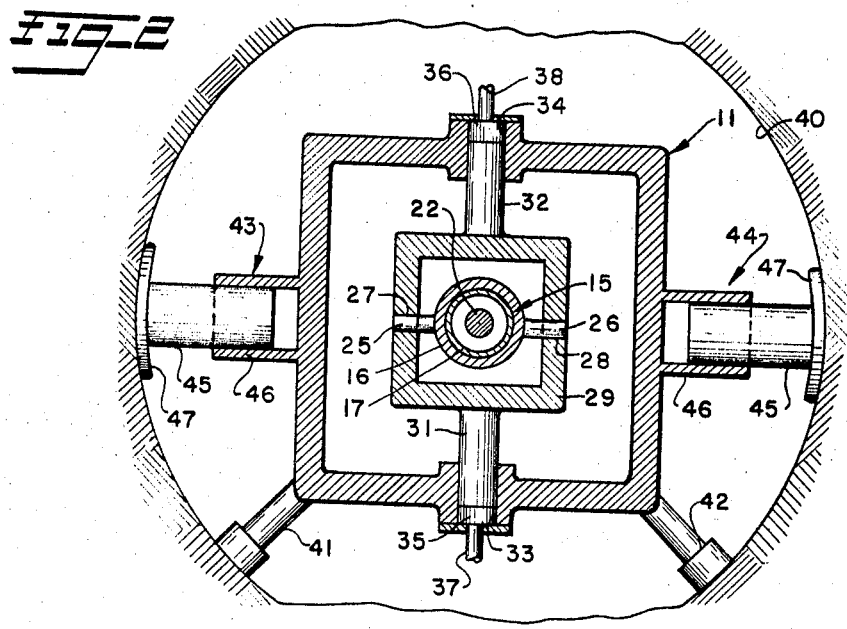
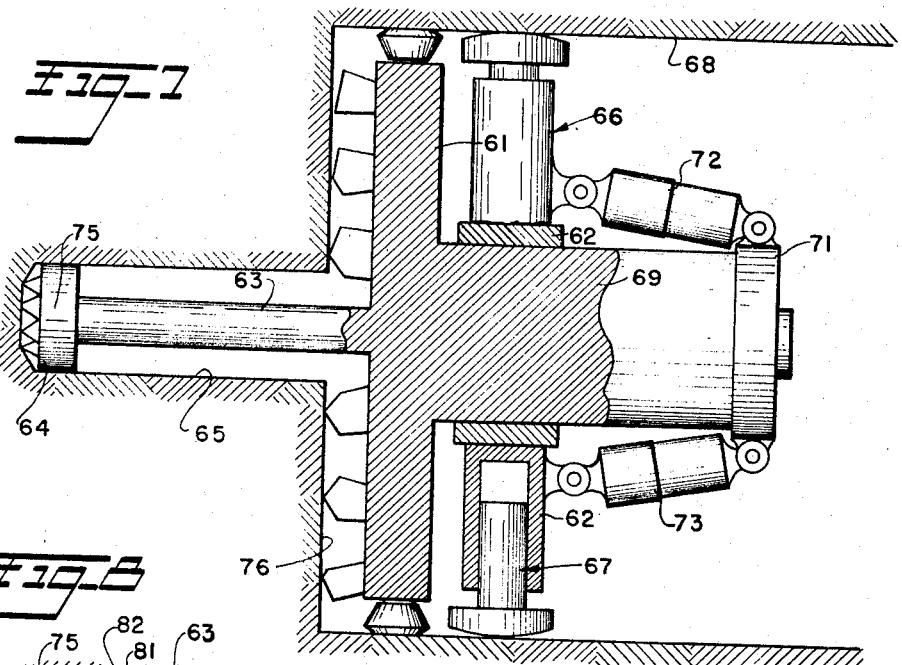
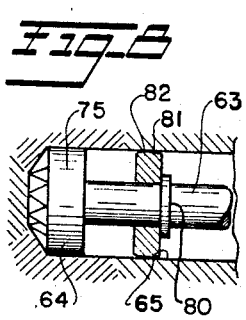
INVENTOR
JAMES C. LAWRENCE
BY Strauch, Nolan + Neale
ATTORNEYS April 8, 1969   J. C. LAWRENCE   3,437,380
STEERING METHOD AND APPARATUS
Original Filed Oct. 2, 1964   Sheet 3 of 7

INVENTOR
JAMES C. LAWRENCE
BY Strauch, Nolan & Neale
ATTORNEYS

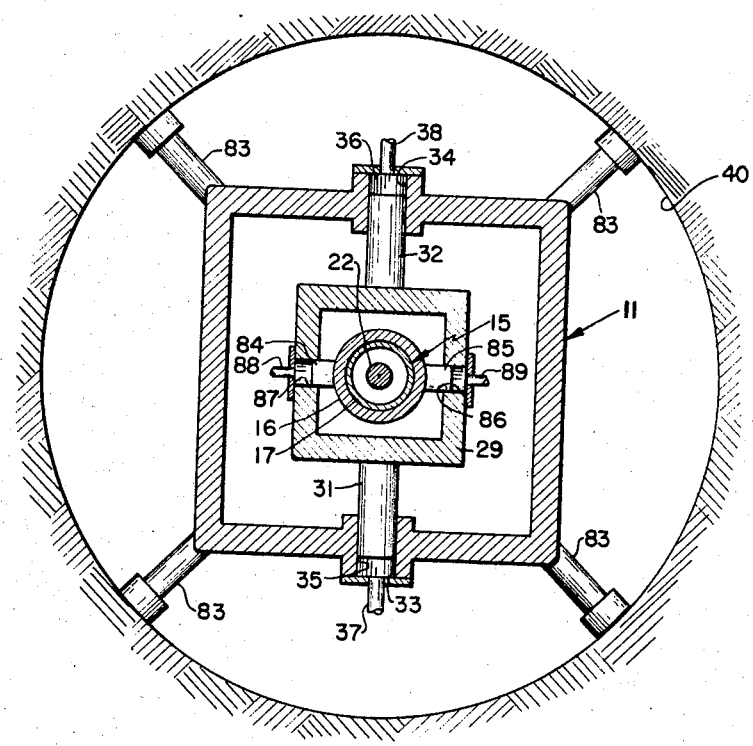

TURNING DATA

| TURN RADIUS (FEET) a' | TURN ANGLE PER SET (DEGREES & MINUTES) ⊖ | CORRESPONDING LATERAL DISPLACEMENT OF MACHINE AXIS (INCHES) △ | 1.5 FOOT SETS PER DEGREE OF TURN |
|---|---|---|---|
| 429.799 | 0°-12' | .5654 | 5.000 |
| 500.00 | 0°-10.474' | .4860 | 5.728 |
| 1000.00 | 0°-5.172' | .2430 | 11.601 |
| 1500.00 | 0°-3.551 | .1620 | 16.897 |

INVENTOR
JAMES C. LAWRENCE

BY Strauch, Nolan + Neale

ATTORNEYS

April 8, 1969  J. C. LAWRENCE  3,437,380
STEERING METHOD AND APPARATUS
Original Filed Oct. 2, 1964

INVENTOR
JAMES C. LAWRENCE
BY Strauch, Nolan & Neale
ATTORNEYS

United States Patent Office 3,437,380
Patented Apr. 8, 1969

3,437,380
STEERING METHOD AND APPARATUS
James C. Lawrence, Seattle, Wash., assignor to Alkirk, Inc., Seattle, Wash., a corporation of Washington
Continuation of applications Ser. No. 401,276, Oct. 2, 1964, and Ser. No. 416,075, Dec. 4, 1964. This application Nov. 6, 1967, Ser. No. 681,035
Int. Cl. E01g 3/04; E21b 7/04; E21c 9/00
U.S. Cl. 299—10                                      10 Claims

ABSTRACT OF THE DISCLOSURE

A method and apparatus for steering a tunnel boring machine which includes a main cutter and a pilot cutter including an anchor assembly. Fluid pressure operated jacks mounted on the frame of the machine engage the sidewalls of the tunnel. The machine is steered by pivoting the main cutter relative to the tunnel about the pilot cutter anchor assembly.

---

This application relates to machines for forming horizontal, vertical and other shafts in hard rock, earth and like material and particularly to special steering arrangements for such machines.

This is a continuation of my copending application Ser. No. 416,075, now abandoned, which was a continuation-in-part of my then copending application Ser. No. 401,276, filed Oct. 2, 1964 for steering method and apparatus and now abandoned.

The invention in its broadest sense provides for steering of a rock, earth and like boring machine by shifting it about a point within the material to be cut and located in advance of the face of the material to be cut. In its preferred embodiment the invention will be described as incorporated in a rock shaft forming machine having a pilot cutter thrust ahead of the main cutter and providing within the material forwardly of the face to be cut an effective fulcrum about which the entire machine may swing at a selected angle for changing the direction of the cutters and hence the shaft direction.

It is the major object of this invention to provide a novel method and apparatus for steering heavy duty earth, rock and like material boring apparatus wherein the entire apparatus is effectively swung about a point forwardly of the face of the material to be cut.

Another object of this invention is to provide a novel method and apparatus for earth, rock and like material boring wherein the apparatus is effectively turned about a point within the material ahead of it for changing the direction of boring.

Another object of the invention is to provide a novel method of steering a machine cutting a shaft in rock, earth, or the like wherein the machine is cyclically shifted through incremental small angles and advanced as it continues to cut during or between such shifts.

A further object of the invention is to provide a novel method and apparatus wherein a rotatable main cutter has a pilot bore forming device projecting forwardly therefrom and means is provided for shifting the apparatus to effectively swing about a point within the pilot bore during operation of the main cutter. Further pursuant to this object the pilot device may be universally anchored with said pilot bore.

Other objects and novel features will become evident in the following detailed description in connection with the attached drawings in which:

FIGURE 2 is a diagrammatic view partly in section showing the mounting of the pilot tube in the machine of FIGURE 1 and the associated machine frame and rib jack structure;

FIGURE 7 illustrates mainly disgrammatically and in section another embodiment of the invention;

FIGURE 8 is a fragmentary view partly in section showing a modification of the machine of FIGURE 7;

FIGURE 9 is a diagrammatic section like FIGURE 2 showing another embodiment;

Figure 1:
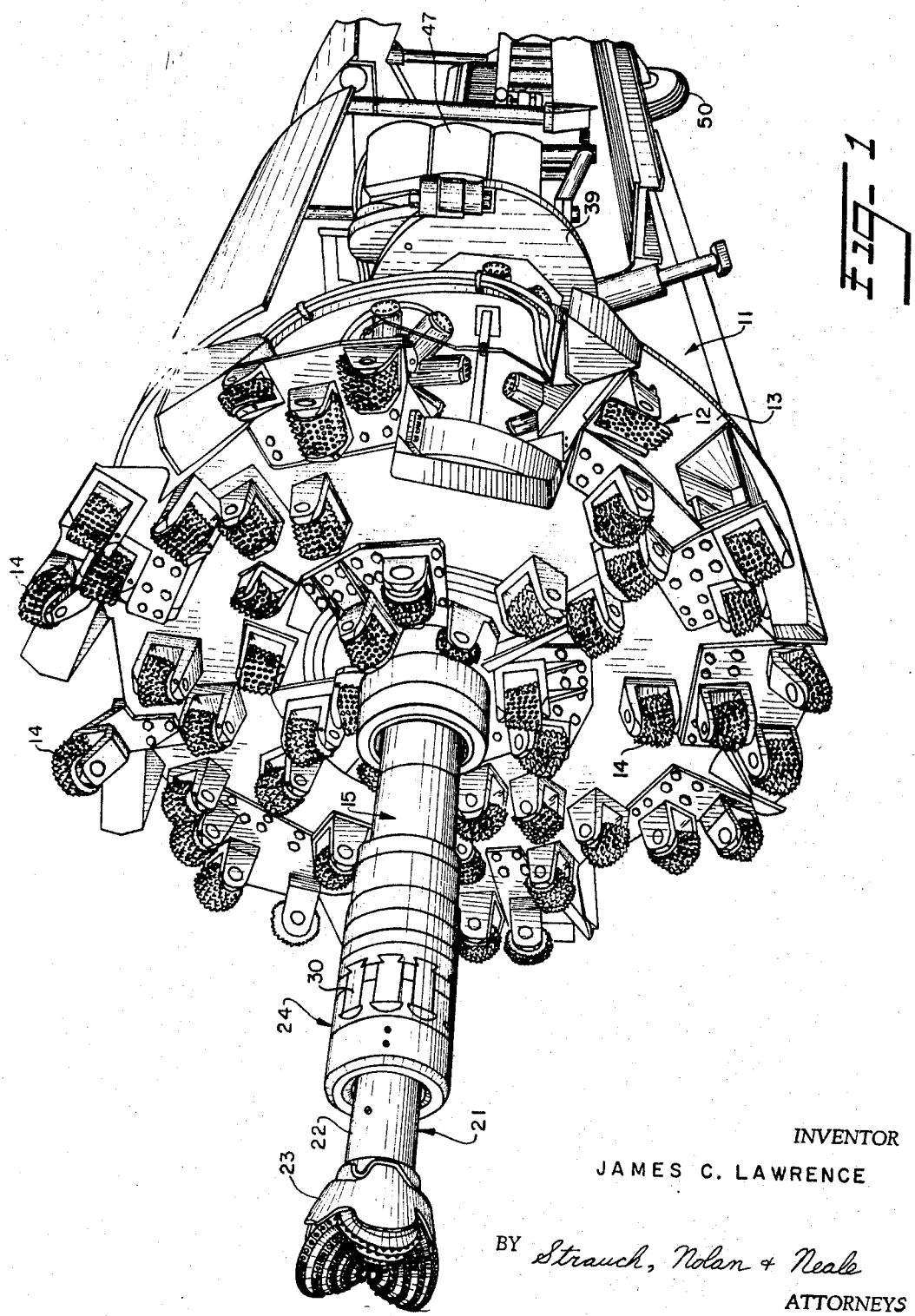
FIGURE 1 is a substantially perspective view showing a rock shaft forming machine according to a preferred embodiment of the invention.

Referring to FIGURE 1, the rock shaft boring machine comprises a frame indicated at 11 for mounting the cutters and associated structure.

The main cutter 12 comprises a relatively large rotatable annular plate assembly 13 upon the front face of which are mounted a series of related cutter bits 14, roller bits being illustrated although any cutters may be employed. In operation the plane of this main cutter may be parallel to the face of the material being cut so that all of the cutter bits 14 advance into the material at about the same time in straight ahead operation. As will appear however, the main cutter need not be rotary, and the face to be cut need not be planar. Where the machine is a horizontal rock tunneler as shown in FIGURE 1, the axis of the main cutter 12 is substantially horizontal. Where the machine is for forming vertical bores, this axis is vertical. The entire main cutter assembly of FIGURE 1 is mounted on frame 11 on a support (not shown) that is shiftable relative to the cutter axis.

Projecting forwardly from the center of the main cutter is a non-rotatable pilot tube asembly 15. This tube 15 is also suitably mounted on frame 11 as will appear, and comprises a longitudinally fixed rear section 16 supported in a gimbal mounting as shown in FIGURE 2, and a longitudinally extensible front section 17. The main cutter 12 selected for illustration of the invention in one embodiment is centrally apertured so as to have at least free rotating and longitudinal movement clearance with respect to tube section 16, and suitable motors (not shown) are provided to continuously rotate the entire main cutter assembly 12 about the axis of the pilot tube. The main cutter support which is suitably slidably mounted on frame 11 is shown at 20 in FIGURES 3–6.

A pilot cutter assembly 21 comprising a rotatable shaft 22 extends through tube 15 to terminate in a cutter bit 23 of larger diameter than the diameter of any part of the pilot tube assembly forwardly of the main cutter. This pilot cutter assembly is suitably mounted within the pilot tube assembly and is adapted to move longitudinally with or independently of the pilot tube front section 17. A suitable motor and drive arrangement, independent of the drive to the main cutter, is provided to rotate the pilot cutter shaft 22.

As shown in FIGURE 1, the forward section of the pilot tube asembly comprises an anchor region 24 wherein a series of elements 30 may be outwardly displaced or expanded to grip the wall of a pilot bore cut by bit 23.

Referring now to FIGURE 2, and the steering structure the rear section 16 of the pilot tube assembly is provided with lateral trunnions 25 and 26 journalled in aligned bearings 27 and 28 of a support 29 which in turn is provided with opposed aligned trunnions 31 and 32 extending at right angles to the pilot tube trunnions. In the rock tunneling machine, the trunnions 25 and 26 are on the horizontal axis of the machine which passes through the pilot cutter shaft 22, and the trunnions 31 and 32 are vertical.

Further, the vertical trunnions 31 and 32 have such sealed fit within the cylinder journals at 33 and 34 that the spaces 35 and 36 serve as pressure cylinders with trunnions 31 and 32 having sliding piston fit therein. Introduction of fluid pressure is effected through conduits 37 and 38, whereby the entire support 29 may be vertically adjusted by changing the relative pressures in chambers 35 and 36.

Frame 11 is essentially supported from below by skids 41 and 42 engaging the floor of the tunnel and, as shown in FIGURE 2, oppositely extending rib jack assemblies 43 and 44 tightly engage the opposite walls of the main tunnel. As shown, each rib jack assembly comprises a piston 45 disposed slidably in a cylinder 46 on the frame and carrying at its outer end a gripping shoe 47 for engaging the tunnel side wall. If desired the rib jacks could be mechanically driven rather than hydraulic units or be of a composite design.

Fluid under pressure introduced into cylinders 46 will urge shoes 47 tightly against the side walls of the tunnel to anchor the frame 11 against any movement relative to the tunnel.

With cylinders 46 in horizontal alignment it will be seen that frame 11 may be displaced to one side or the other within the tunnel by changing the extensions of the respective pistons 45, and this lateral adjustment of the frame 11 is utilized in steering of the machine as will appear. Suitable controls are provided for extending or retracting the rib jack assemblies for different operational phases of the invention.

In operation the machine of FIGURE 1 will be explained starting in the FIGURE 3 position wherein the pilot bore 51 has just been started with the main cutter 12 disposed adjacent the face F of the rock or other material forwardly thereof to be cut. The machine itself is in the main tunnel 52 which is as large or larger than the diameter of the main cutter 12, and the rib jacks 43 and 44 are set tight against the tunnel wall so that the frame 11 is immovable. Here the rib jacks are so located that the axes of main cutter 12 and pilot cutter 23 are coaxial with the main tunnel.

Figure 3:
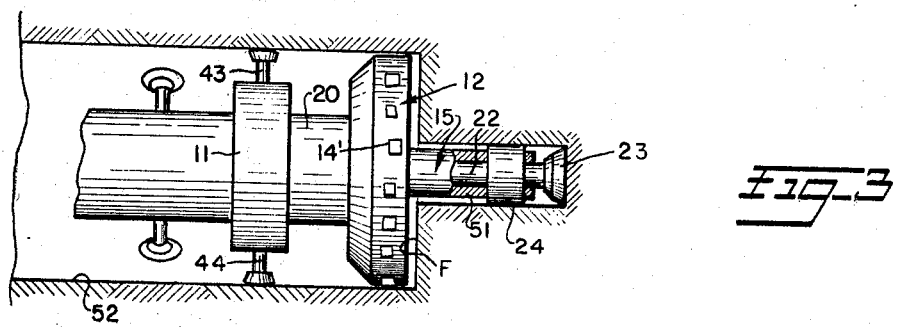
FIGURE 3 is a top plan diagrammatic view showing the machine of FIGURE 1 in operation after the pilot cutter has just started a new cycle.
Figure 4:
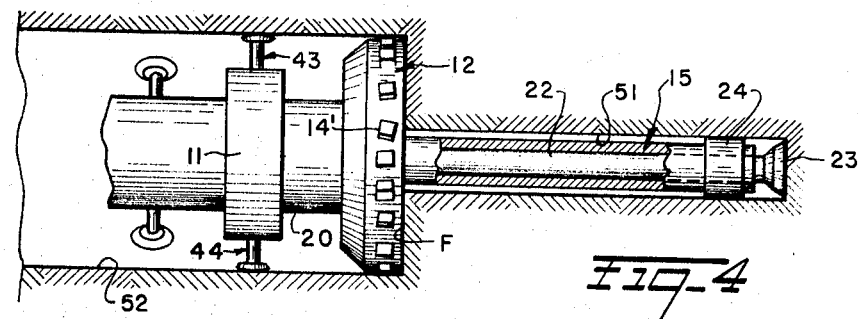
FIGURE 4 is a top plan diagrammatic view of the machine in operation showing the pilot fully extended and anchored and the main cutter starting for normal straight ahead operation.

First the pilot cutter 23 is longitudinally advanced to the right in FIGURE 3. During this period pilot cutter 23 is rotating under power for cutting the pilot bore 51 which is of larger diameter than pilot tube assembly 15. Thus the pilot assembly drills the pilot bore as shown in FIGURE 4. The pilot tube assembly 15 is extended into the bore 51 along with the cutting head 23 or afterward as the case may be. In either event the pilot tube assembly now locates the anchor region 24 well out within the front end of the pilot bore 51, and now the anchor 24 is expanded to anchor the pilot tube asembly within the pilot bore.

If it is desired to cut straight ahead without deviation from the line of the main shaft 52, after the pilot tube is anchored by expanding anchor 24, which for example may be an internally pressurized rubber sleeve enlarged under pressure to grip the wall of the pilot bore, the main cutter 12 is started rotating. Now hydraulic pressure is applied to react between the slidable cutter support 20 and the anchored pilot tube assembly to force the entire main cuter 12 along the pilot tube assembly 15 toward face F. During this operation frame 11 and the pilot tube assembly 15 are stationary, and main cutter 12 cuts a definite length of the full main shaft during its longitudinal stroke as it encounters face F, as shown in FIGURE 4. An optional and most commonly used procedure of tunneling, after the initial pilot bore has been completed as described above, will now be described.

After the initial pilot bore has been cut and the pilot tube assembly 15 is anchored by expansion of anchor 24 of FIGURE 1, the main cuter 12 and pilot cutter 23 are started rotating. Now power is applied to react between the slidable cutter support 20 and the anchored pilot tube assembly 15 to force the main cutter 12 towards reference face F and the pilot cutter away from said reference face. During this operation frame 11 and pilot tube assembly 15 are stationary and the main cutter 12 and pilot bore cutter 23 simultaneously cut a desired length of their respective bores. As can be seen, it is possible to vary the speed of advance of said cutters so that one or the other of cutters 12 and 23 may be selected to advance slower or faster than the other if conditions so require.

The structure and arrangements for applying pressure for so advancing the main cutter 12 into the face F may be the same internal piston and cylinder assembly as disclosed in United States Reissue Patent No. 24,965 and mounted within frame 11. The large torque reaction arising from the main cutter action is absorbed by the right rib jacks through the torque links 39 shown in FIGURE 1.

Figure 5:
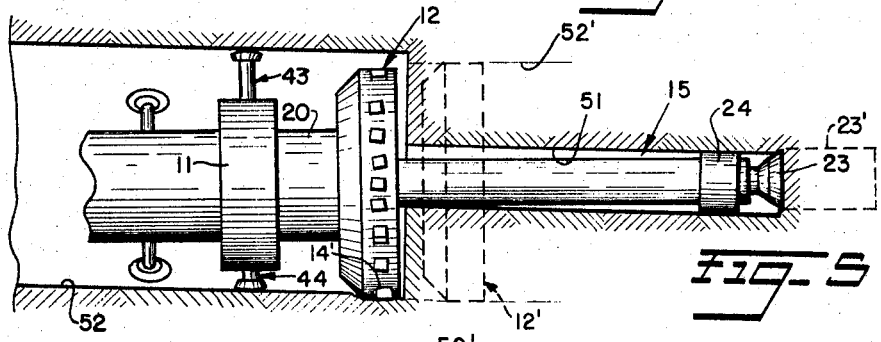
FIGURE 5 is a top plan diagrammatic view showing the rib jacks adjusted to change the lateral attitude of the machine with the pilot bore fully cut and with the machine repositioned for the next advance.

Suppose, however, it is desired to change the direction of main shaft to either seek a new direction or correct it back to a desired straight ahead direction. Jacks 41 and 42 are retracted. With the pilot tube extended and anchored at 24 as shown in FIGURE 4, but before the main cutter advances to face F, the rib jacks are manipulated regulating the relative pressures in opposed cylinders 46 until frame 11 is displaced sideways and angularly in the main shaft 52 as shown in FIGURE 5. For example, as shown in FIGURE 5, rib jack 43 is lengthened and rib jack 44 is shortened to displace frame 11 and the rotating main cutter 12 bodily toward the right side of the shaft end in the general arc generally centered at 24. As the cutter is displaced laterally the peripheral cutters 14' cut into the side wall of the shaft as shown in FIGURE 5.

Because of the vertical trunnions at 31, 32 effectively mounting the otherwise stationary rear end of the pilot tube assembly, this changes the angular disposition of the pilot tube assembly in the transverse plane within pilot bore 51, which is possible because pilot tube 15 is of sufficiently smaller diameter than the pilot bore, the pilot tube assembly 15 effectively pivoting about the anchor point at 24 which is in the material to be cut well in advance of the face F. This inclined position of tube 15 is shown exaggeratedly in FIGURE 5.

With cutters 12 and 23 rotating, the reaction pressure is applied between the anchored pilot tube and the cutter support 20 which is pulled forwardly relative to the frame 11 by a force acting parallel to the new inclined axis of the pilot tube. As the pivoted main cutter advances it peripherally cuts into the face F at its right side in FIGURE 5 by cutters 14 and soon cutter 12 is cutting the full main shaft while simultaneously with said action of the main cutter the pilot cutter also cuts a correction corresponding to the new inclined axis of the pilot tube.

The cutters 12 and 23 are now pulled forwardly in axial alignment with the inclined anchored pilot tube assembly 15 axis as indicated in dotted lines at 12' and 23' in FIGURE 5.

Figure 6:
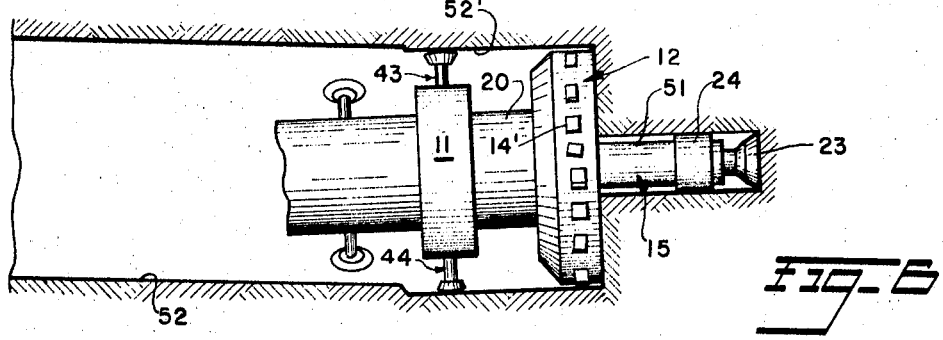
FIGURE 6 is a top plan diagrammatic view showing the steering operation of the machine with the main cutter advancing in its changed direction.

As the operation continues, it is seen that the axis of the main shaft has been changed as shown in FIGURE 6 and cutting of the main shaft continues in the angularly related section 52' as the main cutter 12 pulls up to the anchor. It will be noted that the direction of deviation of the new bore section 52' is opposite to the direction of displacement of frame 11.

As will be appreciated the foregoing actual angle of turn is relatively small, but the turn operation sequence can be repeated many times to obtain the desired eventual redirection of the shaft. The angle of turn and other aspects are exaggeratedly shown in FIGURES 5–6 for purposes of explanation. After each specified advance of cutters 12 and 23, the rib jacks are loosened and the frame 11 moved up along the main cutter support as shown in FIGURE 6.

The foregoing steering accomplishes a turn in the horizontal direction where the shaft is a horizontal one. For turning in the vertical direction, as to seek a new grade, the fluid pressures in cylinders 35 and 36 are adjusted to tilt the rear end of the anchored pilot tube assembly upward or downward as the case may be, and then the frame and main cutter 12 are pulled into the material face as before. In doing so they swing bodily about the anchor point within the material at 24. A combination of these steering shifts will accomplish a change of the shaft axis in any desired direction.

FIGURE 7 illustrates another embodiment wherein a large main cutter 61 is rotatably and slidably mounted on a suitable support structure indicated at 62. Projecting rigidly forwardly from the main cutter so as to rotate therewith is an integral pilot cutter stem 63 having a cutter head 64 of larger diameter than the stem to form a pilot bore 65. A suitable power drive (not shown) is provided to rotate the main cutter 61.

Piston actuated rib jacks 66 and 67 like those in the earlier embodiment are projected laterally from the support structure 62 to engage the side walls of the main shaft 68. The rear end of the main cutter shaft 69 is rotatably mounted in a collar 71, and extensible hydraulic links 72 and 73 are pivotally connected at opposite ends to collar 71 and frame 62 as means to advance cutter 61 in relation to the anchored frame 62.

With the rib jacks 66 and 67 tight with the shaft wall, links 72 and 73 are shortened to shift the rotating cutter 61 directly into the material face. When it is desired to make a turn one or the other of the rib jacks 66 and 67 is shortened and the other lengthened, and this shifts the entire assembly including support structure 62 and the cutter 61 laterally to rock the assembly about a bearing point approximately at 75 where the pilot cutter head is disposed within the pilot bore 65 ahead of the face 76 of the material to be cut. Then, when the main cutter 61 is driven and forced into the material, the further shaft cut by the main cutter will be disposed at an angle to the shaft 68 corresponding to the adjusted orientation of the stem 63.

FIGURE 8 shows a further embodiment wherein a universal rocking collar 81 may be provided within the pilot bore to provide the machine swivel point ahead of face 76 about which the entire cutter assembly is swung to change the direction of the cutting axis. Preferably collar 81 is loose on stem 63 and has an arcuate peripheral surface at 82 for easy rocking when the stem is rocked. A retainer ring 80 on the shaft insures the forward location of the fulcrum collar 81.

Referring to FIGURE 9, the frame 11 is mounted, in the shaft 40 being cut, by a plurality of circumferentially disposed jack assemblies 83 which when properly adjusted locate the center of shaft 22 in line with the center of shaft 40.

As in FIGURE 2, the vertical trunnions 31 and 32 enter piston chamber 35 and 36, so that differential pressure in these chambers displace the support 29 for the rear end of the pilot tube assembly vertically. In this embodiment the pilot tube assembly 15 is similarly provided with horizontal trunnions 84 and 85 which also fit as pistons in pressure chambers 86 and 87, respectively, supplied with air or hydraulic fluid under pressure by lines 88 and 89 respectively. The described embodiment of fluid activated means to displace support 29 to effect steering could be equally facilitated by mechanical means, by for example, introducing threaded or toggle operated devices at trunnions 31, 32, 84 and 85, instead of introducing pressurized fluid into a chamber.

In this embodiment the corner jacks 83 to the shaft walls are not disturbed for steering. Instead the various horizontal and/or vertical displacements of the main cutter and pilot tube for steering are effected by control of the differential pressures at the trunnion ends.

SPECIFIC EXAMPLES

The foregoing principles will be applied to specific applications of the invention. These principles are exemplified and illustrated in FIGURES 10–16. These specific applications are based on a specific size of machine and also on the assumption the pilot anchor in said machine is fully advanced. This condition will thus provide a certain maximum angle within which the steering correction can take place. However, inasmuch as this angle is a function of the space between pilot tube assembly 15 and pilot bore 51, it can be seen by reference to FIGURE 5 that the possible angle of correction gets greater the closer the pilot anchor 24 is to the main cutter 12. Inasmuch as a table giving all of the possible variations becomes too complex for this description, only two basic examples will be discussed from which the invention will be clear in all respects, it being sufficient to note that a greater number of short advances at steeper angles of correction will result in a shorter curve and also a shorter distance of total advance for any desired correction of measured error.

EXAMPLE I

Figures 10, 11:
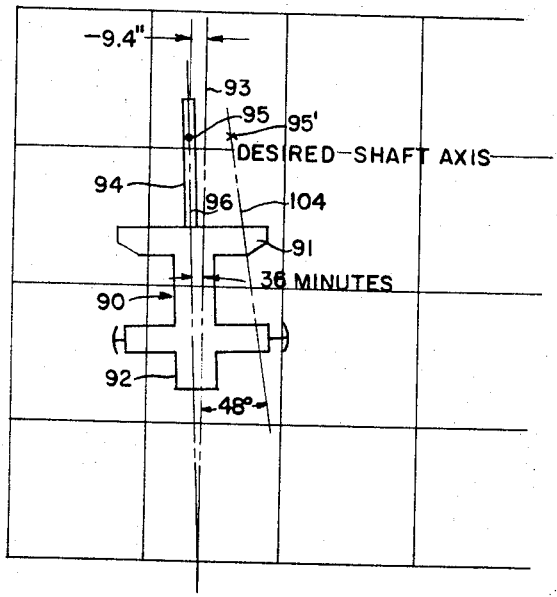
FIGURE 10 is a diagrammatic view for illustrating the action of the invention in accord with specific examples.
FIGURE 11 is a table showing turning data to be used in connection with FIGURE 9.

FIGURE 10 diagrammatically shows a condition existing within a shaft involving a machine of any of the types of FIGURES 1–9, wherein the machine 90 embodying a main cutter 91 mounted on a support 92 within a shaft having a desired central axis 93. The projecting pilot cutter 94 is disposed in a pilot bore in the material ahead of the face to be cut within which is the anchor point 95, corresponding to 24 in FIGURES 3–6 and 75 in FIGURE 7 for example.

The machine has wandered to the left from the desired shaft axis 93, and the current machine axis is indicated at 96 which is disposed at a measured angle of 36 minutes with respect to axis 93. If the machine were properly on the shaft axis, point 95 would lie on axis 93, but in the illustrated condition point 95 has a measured lateral displacement of 9.4 inches, indicated as −9.4 because it is to the left in FIGURE 10. Displacement to the right would be indicated plus.

The problem essentially involves restoration of the anchor point 95 to the desired shaft axis 93 and axis 96 coincident with axis 93, and this is done in the following manner.

In this example, according to an important phase of the invention, the total correction is effected in a series of incremental turns, during each of which turns the machine is swung a small angle about its anchor point 95 and advanced to cut the shaft for the full longitudinal stroke of main cutter.

The particular incremental angles of turn are usually related to an arbitrarily selected standard turn radius for a particular machine or type of machine. In the present instance FIGURE 11 shows a series of correlated incremental turn angles for different turn radii and where the main cutter stroke is 1.5 feet between each lateral displacement of the machine.

Figure 13:
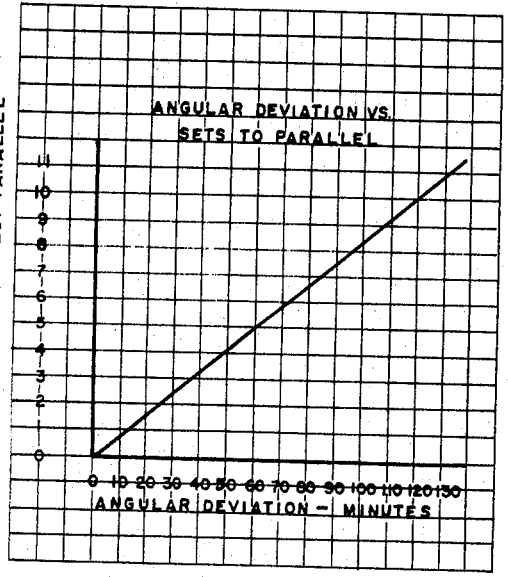
FIGURES 13, 14 and 15 are graphs representing the standard condition of FIGURE 11, for use in determining corrective action.
Figure 14:
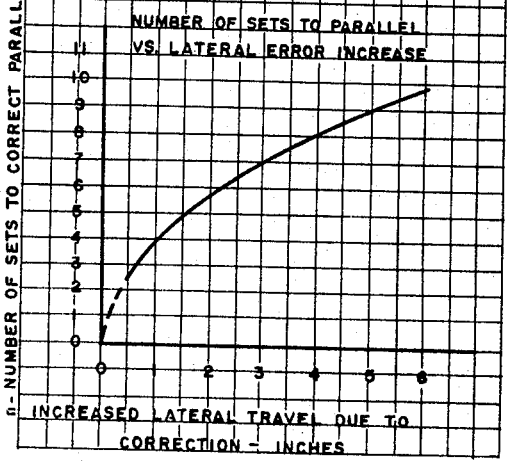
Figure 15:
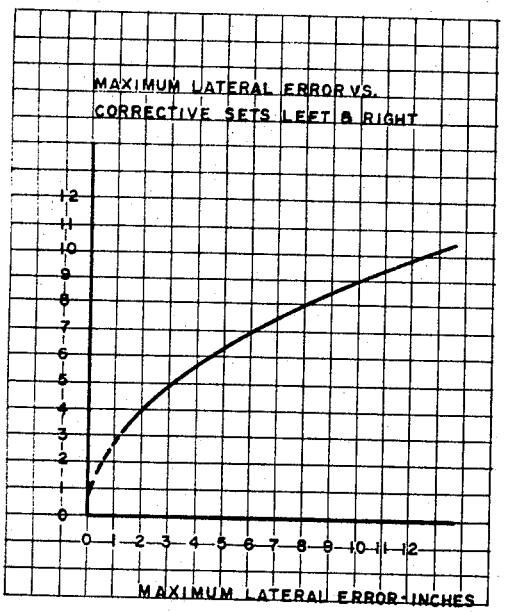

Proceeding now to apply the so-called standard data to the problem at hand, each incremental turn angle is selected as 12 minutes, and the necessary number of sets of turns can be ascertained from FIGURE 13. FIGURES 13, 14 and 15 are based on the standard turn radius of 429.799 feet, incremental angles of 12 minutes and a main cutter stroke of 1.5 feet. Thus, referring first to FIGURE 13, for correcting an angular deviation of 36 minutes three sets of incremental turns are required.

Figure 12:
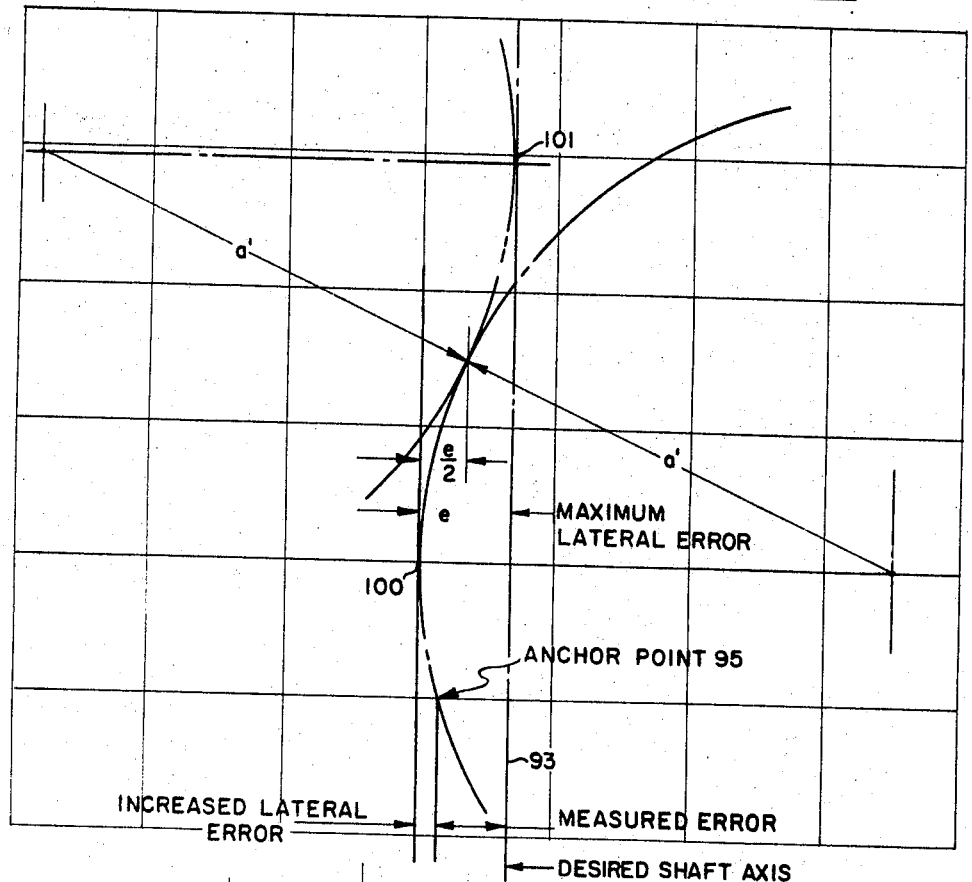
FIGURE 12 is a diagrammatic representation showing the corrective factors applied during the Example I correction.

Referring to FIGURES 10 and 12, it will be noted that when the machine is swung clockwise through the first 12' angle about point 95 the main cutter will actually be displaced in that direction and away from the desired shaft axis 93. This increases the effective lateral displacement of point 95 during the operation, and the increased lateral displacement due to the correction procedure can be ascertained from FIGURE 14. Thus for three sets of incremental turns, the added lateral displacement is about 0.65 inches, and this is added to the existing 9.4 inch displacement to obtain a total lateral displacement during correction of about 10 inches.

Now reference is made to FIGURE 15 wherefrom it will be seen that for a 10 inch lateral displacement the number of sets required to return to parallelism will be nine sets to the right and nine sets to the left, that is nine sets wherein the machine is displaced 12 minutes to the right in FIGURE 12, then the main cutter advanced 1.5 feet, then displaced to the right 12 minutes, etc. until a cycle of nine sets to the right is completed. Then the machine is shifted nine sets to the left.

Reference to FIGURE 12 will shown why these successive displacements are necessary, because during the first three sets the anchor point 95 may be regarded as shifted along the average arc of radius $a'$ (429.799 feet) in the direction away from the desired axis 93 and then, after reaching the furthest point 100, during the next nine sets the machine is shifted to the right a distance of $e/2$ and then during the last nine sets the machine is shifted to the left a distance of $e/2$ to restore point 95 to coincidence with axis 93 at point 101 at which time axis 96 of the machine is restored to coincidence with axis 93 of the shaft.

EXAMPLE II

Figure 16:
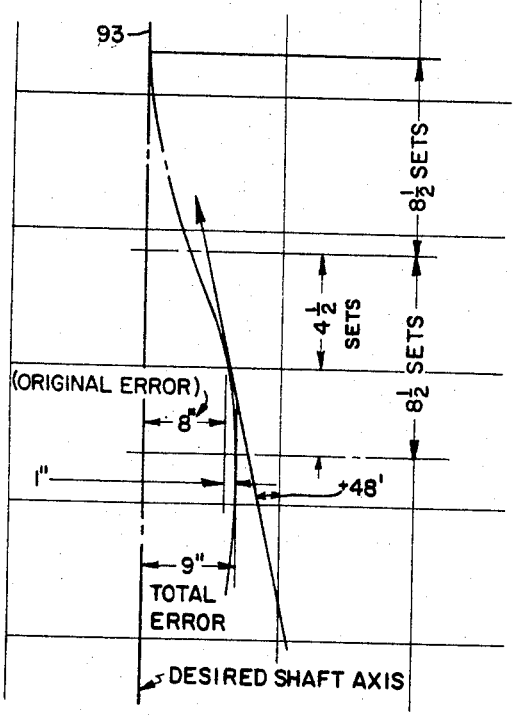
FIGURE 16 is a diagrammatic representation showing the corrective factors applied during the Example II correction.

Assume for this example that the machine 90 of FIGURE 10 has wandered off to the right in FIGURES 10 and 16 with respect to desired shaft axis 93, so that pivot point 95' ahead of the face to be cut is located at a measured lateral displacement of 8 inches and disposed at an angle of −48 minutes, the axis being indicated diagrammatically at 104 in FIGURE 10.

Referring to FIGURE 13 it will be seen that four sets of 12 minute incremental turns are required, and from FIGURE 14 the increased lateral error during correction will be 1 inch. From FIGURE 15, using a total lateral correction of nine inches. The total number of required sets is 8½ sets left and 8½ sets right.

However, since the machine axis 104 is already inclined at 48 minutes toward the desired axis 93 the situation is much the same as existed at point 100 during the Example I correction except that the machine is already equivalently displaced 4 sets in the proper direction. This is subtraction from the first 8½ sets leaving 4½ sets as shown in FIGURE 16. Therefore the cycle would comprise first 4½ sets during which the machine was swung about its anchor 95' toward the axis 93 and then 8½ sets away from axis 93, at the end of which point 95' would lie on the desired shaft axis and the machine axis coincide with the desired shaft axis.

While the foregoing embodiments describe the main shaft as being formed in a general horizontal direction it is apparent that the invention may be applied to the steering of such machines for forming main shafts in a vertical direction or any angle intermediate horizontal and vertical, the invention being concerned essentially in the method and apparatus for steering the machine to effect changes in main shaft direction. Where the shaft is vertical the frame 11 will be suspended and its orientation relative to the shaft controlled by suitable rib jacks of the type illustrated herein all around it.

Further, while a rotary main cutter is shown in both embodiments, the invention contemplates machines having any face cutting means such as reciprocable or oscillating cutter members in the main cutter assembly. The invention is thus independent of the nature of the main cutter.

Also, while a rotary pilot cutter is herein described the invention is independent of the particular means used to form the pilot bore since reciprocal or independent pilot shaft cutters may be employed.

Moreover, while face F is shown as a planar face it will be understood that it may be of any contour depending upon the main cutter, as for example it may be conical where the main cutter has a conical array of cutter bits.

While the specific examples of the invention relate essentially to corrective features it will be apparent from FIGURE 11 that the machine may be operated to cut a shaft in a predetermined arc, by sequential small angle displacements of the machine and main cutter advances. If desired a probe may extend ahead of the machine to indicate shaft deviation from a desired direction and to automatically initiate corrective operations such as the foregoing.

What is claimed and desired to be secured by Letters Patent is:

1. The method of steering a boring machine having a main cutter for boring a main shaft and a pilot cutter assembly including a pilot cutter and anchoring means for boring a pilot hole ahead of said main shaft comprising the steps of:
    boring a pilot hole with said pilot cutter assembly into the face of the material to be bored;
    anchoring said anchoring means within said pilot hole;
    swinging said main cutter through an angle with respect to the face of the material about the anchoring point of said anchoring means; and
    advancing said main cutter into the material face at said angle while holding said anchoring means substantially fixed.

2. The method of claim 1 wherein said main cutter is swung through said angle by cutting into the side of said main shaft in a direction opposite to the direction of a desired turn and by adjusting positioning jacks.

3. The method of claim 2 wherein said steps are cyclically repeated to obtain a desired angle of turn of said main shaft.

4. A machine for boring a shaft comprising:
    a frame;
    a main cutter longitudinally movable relative to said frame for boring a main shaft;
    a pilot cutter assembly extending forwardly of said main cutter for boring a pilot shaft into the face of material to be bore ahead of the main shaft;
    steering structure disposed on said frame for displacing said main cutter angularly with respect to said main shaft about a point within said pilot shaft ahead of said material face; and
    means for anchoring a portion of said pilot cutter assembly within said pilot shaft to provide the point about which said main cutter is angularly displaced.

5. The machine of claim 4 wherein said steering structure includes first means for moving said main cutter in a horizontal plane and second means for moving said main cutter in a vertical plane.

6. The machine of claim 5 wherein at least one of said first means and said second means includes pressure actuated jacks for engaging the walls of said shaft.

7. The machine of claim 5 wherein at least one of said first means and said second means includes opposed aligned trunnions adapted to be acted on by fluid under pressure to adjust the angular position of said main cutter.

8. The machine of claim 7 wherein the other of said means and said second means includes at least a pair of opposed aligned fluid pressure actuated jacks disposed on said frame for engaging the walls of said shaft.

9. The machine of claim 8 wherein said pilot cutter assembly is extensible with respect to said main cutter.

10. A machine for boring a hole in hard rock comprising:
- a frame;
- a main cutter supported by said frame for boring a main hole;
- a shaft extending forwardly of said main cutter;
- a rotating pilot cutter mounted at the forward end of said shaft for drilling a pilot hole into the face of the material to be bored ahead of said main hole;
- steering structure disposed on said frame for guiding said main cutter towards a point located within said pilot hole ahead of said material face and for pivoting the main cutter in any direction to swing the axis of the main cutter about said point and establish an angle between the axis of the main cutter and the longitudinal axis of the main hole to thereby change the direction of boring said main hole toward said point;
- said steering structure being capable of pivoting said main cutter in all directions about said point;
- said pilot cutter being dimensioned to bore a pilot hole which is larger than said shaft measured in any direction from the longitudinal axis of the pilot hole to allow said shaft to be moved angularly in said pilot hole when said main cutter is swung about said point.

References Cited

UNITED STATES PATENTS

| | | |
|---|---|---|
| Re. 24,965 | 4/1961 | Kirkpatrick. |
| 1,326,480 | 12/1919 | Dana. |
| 2,699,328 | 1/1955 | Alspaugh et al. |
| 2,715,526 | 8/1955 | Letts. |
| 2,756,036 | 7/1956 | McIntyre. |
| 2,885,182 | 5/1959 | Hering. |
| 3,061,287 | 10/1962 | Robbins. |

ERNEST R. PURSER, *Primary Examiner.*

U.S. Cl. X.R.

299—31, 60; 175—61, 62, 81, 230